(12) United States Patent
McPhee

(10) Patent No.: US 12,140,171 B2
(45) Date of Patent: Nov. 12, 2024

(54) MOVEMENT-FREE QUICK DETACH LATCH

(71) Applicant: John Robert McPhee, Raeford, NC (US)

(72) Inventor: John Robert McPhee, Raeford, NC (US)

( * ) Notice: Subject to any disclaimer, the term of this patent is extended or adjusted under 35 U.S.C. 154(b) by 845 days.

(21) Appl. No.: 17/245,693

(22) Filed: Apr. 30, 2021

(65) Prior Publication Data

US 2021/0341253 A1  Nov. 4, 2021

Related U.S. Application Data

(60) Provisional application No. 63/018,614, filed on May 1, 2020.

(51) Int. Cl.
*F16B 21/16* (2006.01)
*F41C 23/02* (2006.01)

(52) U.S. Cl.
CPC .......... *F16B 21/165* (2013.01); *F41C 23/02* (2013.01)

(58) Field of Classification Search
CPC ........ Y10T 24/12; F41C 23/02; F41C 33/002; F41C 33/006; F41C 33/007; F16B 13/0891; F16B 21/165
See application file for complete search history.

(56) References Cited

U.S. PATENT DOCUMENTS

| | | | | |
|---|---|---|---|---|
| 2,078,010 A * | 4/1937 | Meepos | ................ | F41C 23/02 24/265 CD |
| 2,480,662 A * | 8/1949 | McKinzie | ............ | F41C 23/02 24/607 |
| 2,639,480 A * | 5/1953 | Magid | ................ | F41C 23/02 24/265 R |
| 2,642,689 A * | 6/1953 | Cline | ................ | F41C 23/02 24/607 |
| 3,392,427 A * | 7/1968 | Lane | ................ | F16B 21/09 24/628 |
| 4,685,237 A * | 8/1987 | Hugg | ................ | F41C 23/02 403/349 |
| 5,452,979 A * | 9/1995 | Cosenza | ............ | B60R 21/2035 411/348 |
| 7,562,481 B2 * | 7/2009 | Esch | ................ | F41C 23/02 24/2.5 |
| 8,832,985 B2 * | 9/2014 | Smith, III | ............ | F41C 33/006 224/150 |
| 9,107,464 B2 * | 8/2015 | Tom | ................ | A42B 3/0473 |
| 9,243,866 B2 * | 1/2016 | Roberts | ................ | F41C 33/006 |
| 9,447,815 B2 * | 9/2016 | Roberts | ................ | F16B 45/002 |
| 9,557,138 B2 * | 1/2017 | Alford | ................ | F41C 33/002 |
| 9,921,029 B2 * | 3/2018 | Roberts | ................ | F41C 33/006 |
| 10,724,827 B2 * | 7/2020 | Brock | ................ | F41C 33/001 |
| 10,731,945 B2 * | 8/2020 | Tower | ................ | F41C 23/02 |
| 10,801,807 B2 * | 10/2020 | DeSomma | ............ | F41A 3/66 |

FOREIGN PATENT DOCUMENTS

| | | | | |
|---|---|---|---|---|
| DE | 202012011836 U1 * | 3/2013 | ............ | F41C 23/02 |
| GB | 1104629 A * | 2/1968 | ............ | B60R 22/18 |
| WO | WO-8500423 A1 * | 1/1985 | ............ | F41C 23/02 |

* cited by examiner

*Primary Examiner* — Matthew R McMahon
(74) *Attorney, Agent, or Firm* — Eversheds Sutherland (US) LLP

(57) ABSTRACT

Movement-free quick detach latches. The latches include a monolithic body, a button, a spring, and ball-bearings configured to reduce or eliminate movement when attaching or removing the latch from a rifle, eliminate moving parts that may fail in use, remove the interfacing of a bail with the button, and lower the profile of the latch with the rifle.

20 Claims, 6 Drawing Sheets

MOVEMENT-FREE QUICK DETACH LATCH

CROSS-REFERENCE TO RELATED APPLICATION

This application claims priority to U.S. Provisional Patent Application No. 63/018,614, filed May 1, 2020, which is incorporated by reference in its entirety.

FIELD OF THE DISCLOSURE

This disclosure relates generally to rifles and rifle slings and, in particular, relates to latches for securing a sling to a rifle.

BACKGROUND

Rifles are used by the military, hunters, policemen, and others. Wielders of rifles typically sling the rifle across their torso using a rifle sling consisting of an adjustable strap. The sling attaches to two points of the rifle, typically at the stock and on a portion of the barrel, stock or handguard of the rifle. Since the sling permits the rifle to be stowed in a variety of positions against the wielder's body, the points of contact between the sling and the rifle must be adaptable to many positions. Regardless of the position, however, the rifle must always be readily accessible at a moment's notice, particularly when used by the military in conflict zones.

In addition to easy manipulation, slings are often detachable from the rifle. This is useful in situations where slings are made to fit a variety of rifle platforms, when rifles are mass-produced, when rifles are exchanged between persons of right-handedness and left-handedness, etc. The ability to quickly detach the sling from the rifle has become a standard. However, the ability to quickly detach the sling from the rifle must not otherwise jeopardize the manipulability of the sling or the ease of readying the rifle. Furthermore, the quickly detachable sling must not come at the expense of reliability.

Prior quick detach latches for slings have been adapted to rifles by other markets, such as climbing or other sports. These quick detach latches are formed out of a pin and button that is inserted into a mounting point on the rifle having a movable bail that the sling attaches to. The bail is threaded through the pin and interfaces with the button. As a result, users who wish to attach or release the latch to or from the rifle will use the sling itself for leverage as they press the button, increasing the pressure on the movable bail and often resulting in failure of the bail. Furthermore, the movable bail swings like a bucket handle, so the weight and position of the rifle will shift and sag depending on the positioning of the rifle upon the user's body, both during actuation of the button and while the sling is attached to the rifle.

Accordingly, improved quick detach latches having no movement during button actuation for securing slings to rifles are needed.

BRIEF DESCRIPTION OF THE DRAWINGS

The detailed description is set forth with reference to the accompanying drawings. The use of the same reference numerals may indicate similar to identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Figure 1:
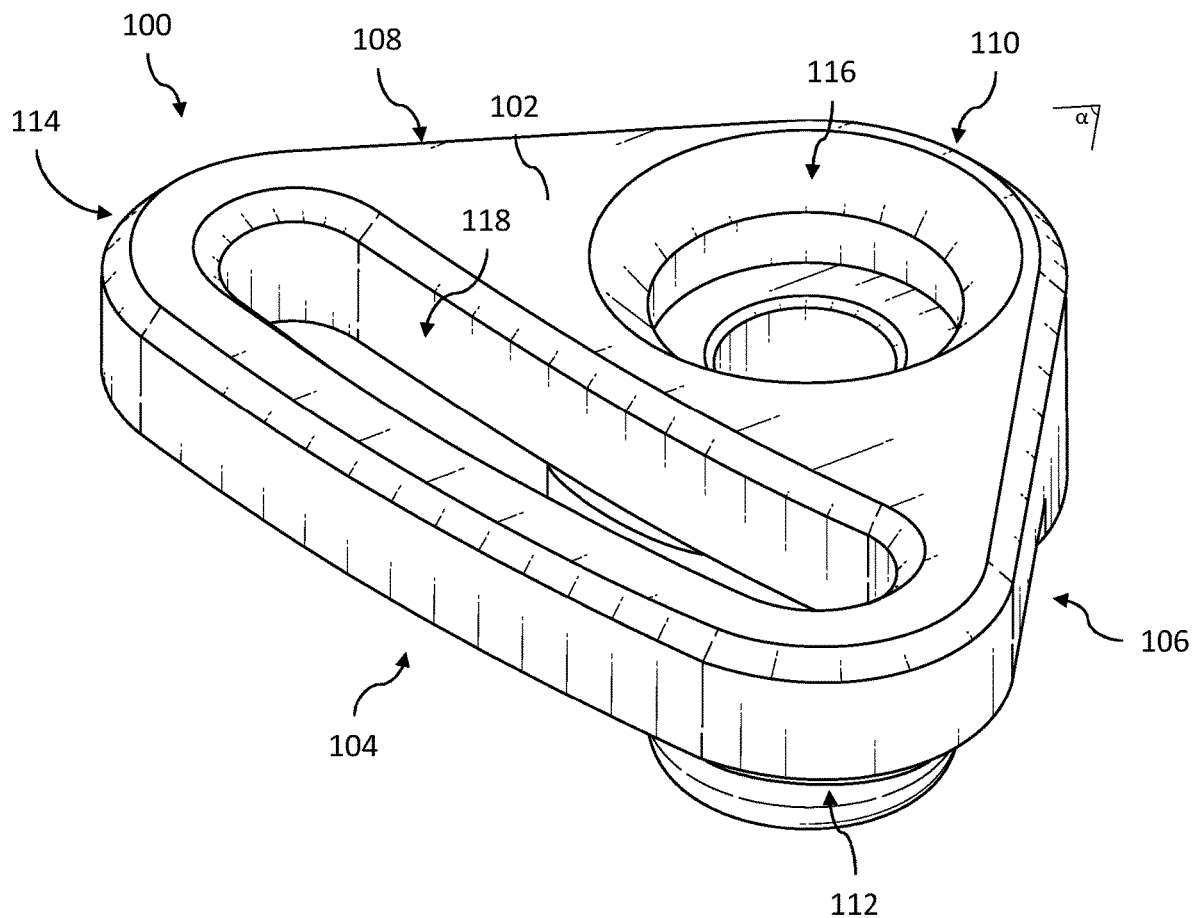
FIG. 1 is a perspective view of a quick detach latch body in accordance with the present disclosure.

Movement-free quick detach latches are provided herein including latches having monolithic bodies that advantageously reduce or eliminate movement when attaching or removing the latch to a rifle, eliminate moving parts that may fail in use, remove the interfacing of the bail with the actuating button, and lower the profile of the latch with the rifle. The embodiments are described in detail herein to enable one of ordinary skill in the art to practice the movement-free quick detach latches, although it is to be understood that other embodiments may be utilized and that logical changes may be made without departing form the scope of the disclosure.

Throughout this disclosure, various aspects are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6, etc., as well as individual numbers within that range, for example, 1, 2, 3, 4, 5, and 6. This applies regardless of the breadth of the range.

Any known method of making latches can be used to make the latches herein. For example, the latches may be machined from a block of material, printed by a 3-D printer, cast in a mold, or another suitable method.

Any know material suitable for quick detach latches may be used to formulate the latches herein. For example, the latches may be made out of a metal such as aluminum, steel, another metal, or an alloy thereof. For example, the latches may be made out of a polymer or plastic. Any suitable material may be used.

Movement-free quick detach latches have been produced having a monolithic body, a button, a spring, and ball-bearings. The monolithic body includes a channel defining a bail for attaching a rifle sling. By forming the body out of a monolithic piece of material, the latch has little or no movement when actuating the button, and the latch can maintain a low profile to the rifle at all times.

Movement-Free Quick Detach Latches

Latches for attaching slings to rifles are disclosed herein. In some embodiments, the latch includes a monolithic body.

The latch may include a cylindrical button, a spring, and/or a plurality of ball-bearings. In some embodiments, the body includes a planar first portion having a first thickness and a triangular shape with three sides and three corners. A first side of the body may have a first radius of curvature, and a second and third sides of the body may be straight. Each of the three corners may be rounded.

As used herein, "monolithic" refers to an item or structure having a unitary, continuous composition throughout, with no separable or movable pieces.

As used herein, a "planar" portion refers to a portion having a substantially flat profile in at least one dimension. In some embodiments, a "planar" first portion may have a triangular shape when viewed along, for example, a Z-axis, and the portion may have a thickness in the Z-direction, and the portion may have an "upward-facing" surface extending in the X- and Y-axes that is substantially flat.

The use of relational terms, such as, but not limited to, "top," "bottom," "left," "right," "front," "back," "upward," "downward," "beneath," "underside," and the like are used in the written description for clarity in specific reference to the Figures, or to refer to the relative disposition of portions of the latch, and are not intended to further limit the scope of the invention or the appending claims. For example, a portion may be "beneath" another portion, but such a portion does not necessarily have to be on the "bottom" as viewed by an observer. Any relative positioning in three-dimensional space of the portions and components of the latch is contemplated.

In some embodiments, the button is disposed within a circular hole having a center located proximal to a first corner and equidistant from the second and third sides of the body. In some embodiments, the body includes a curved channel disposed proximal to the first side of the body. The channel may have a radius of curvature equal to the first radius of curvature of the first side of the body.

As used herein, a "channel" refers to an elongated hole, having no material therein.

In some embodiments, the curved channel extends from a second corner of the body to a third corner of the body. The curved channel may be configured to accept a strap of the sling. In some embodiments, the curved channel defines a bail in the body around which the strap of the sling attaches.

As used herein, a "bail" refers to a length of material configured to secure a strap of a sling to the latch. In some embodiments, a bail resembles a bar, rod, handle, or other elongated, rigid piece of material.

In some embodiments, the body includes a hollow, cylindrical second portion having a first outer diameter and a second thickness located on the underside of the first portion proximal to the first corner. The hollow, cylindrical second portion may have a center coincident with the center of the circular hole of the first portion such that the hollow, cylindrical second portion and the circular hole share a common inner surface and a common inner diameter.

As used herein, a center "coincident" with the center of the circular hole refers to the center of the second portion being on the same axis as the center of the circular hole.

In some embodiments, the curved channel is unobstructed by the second portion.

In some embodiments, the body includes a hollow, cylindrical third portion having a second outer diameter and a third thickness located on the underside of the second portion. The second outer diameter of the third portion may be less than the first outer diameter of the second portion. The hollow, cylindrical third portion may have a center coincident with the center of the hollow, cylindrical second portion and the center of the hole such that the hole, the second portion, and the third portion share the common inner surface and a common inner diameter.

In some embodiments, the third portion includes a plurality of ball-bearing holes, each ball-bearing hole corresponding to one of the plurality of ball-bearings.

In some embodiments, the body includes a round, fourth portion having a third diameter and a third thickness located on the underside of the hollow, cylindrical third portion. The third diameter may be equal to the second outer diameter of the third portion. The fourth portion may have a center coincident with the center of the hollow, cylindrical third portion such that the hole, the second portion, the third portion, and the fourth portion share a common inner surface.

In some embodiments, the first thickness of the first portion is from about 0.1 inches to about 0.5 inches. For example, the first thickness may be 0.1 inches, 0.2 inches, 0.3 inches, 0.4 inches, 0.5 inches, or any thickness therebetween. In some embodiments, the second thickness of the second portion is from about 0.05 inches to about 0.3 inches. For example, the second thickness may be 0.05 inches, 0.1 inches, 0.2 inches, or 0.3 inches. The second thickness may be 0.072 inches, 0.151 inches, 0.234 inches, or any thickness therebetween.

In some embodiments, the third thickness is from about 0.1 inches to about 1 inch. For example, the third thickness may be 0.1 inches, 0.3 inches, 0.5 inches, 0.7 inches, or 1 inch. The third thickness may be 0.212 inches, 0.302 inches, 0.582 inches, 0.811 inches, or any thickness therebetween. In some embodiments, the fourth thickness is from about 0.03 inches to about 0.11 inches. For example, the fourth thickness may be 0.03 inches, 0.05 inches, 0.07 inches, 0.09 inches, or 0.11 inches. The fourth thickness may be 0.043 inches, 0.072 inches, 0.98 inches, 0.105 inches, or any thickness therebetween.

In some embodiments, the latch has an overall thickness of from about 0.25 inches to about 2 inches. For example, the overall thickness may be 0.25 inches, 0.725 inches, 1.25 inches, 1.75 inches, 2 inches, or any thickness therebetween depending on the desired relative dimensions of the first portion, second portion, third portion, and fourth portion.

As used herein, the "overall thickness" refers to the thickness of the latch from the top of the first portion to the bottom of the fourth portion.

In some embodiments, the hole has a chamfered edge so that the button may be more easily pressed inward. In some embodiments, the hole has an inner diameter of from about 0.1 inches to about 0.3 inches. For example, the inner diameter may be about 0.1 inches, 0.175 inches, 0.225 inches, or 0.3 inches. The inner diameter may be 0.112 inches, 0.698 inches, 0.218 inches, 0.297 inches, or any diameter therebetween.

In some embodiments, the second side of the body and the third side of the body form an angle with each other of from about 60° to about 100°. For example, the angle may be 60°, 70°, 80°, 90°, or 100°. The angle may be 62.257°, 77.935°, 89.197°, or any angle therebetween.

In some embodiments, the third side of the body has a radius of curvature of from about 2.5 inches to about 4.5 inches. For example, the radius of curvature may be 2.5 inches, 3 inches, 3.5 inches, 4 inches, or 4.5 inches. The radius of curvature may be 2.712 inches, 3.323 inches, 3.977 inches, 4.409 inches, or any radius therebetween.

In some embodiments, the curved channel has rounded ends. The curved channel may have a length of from about 0.5 inches to about 2 inches, as measured from the center of curvature of each of the rounded ends. For example, the curved channel may have a length of 0.5 inches, 1 inch, 1.5 inches, or 2 inches. The curved channel may have a length of 0.865 inches, 1.245 inches, 1.872 inches, or any length therebetween. In some embodiments, the curved channel has a width of from about 0.05 inches to about 0.4 inches. For example, the curved channel may have a width of 0.05 inches, 0.15 inches, 0.25 inches, 0.35 inches, or 0.4 inches. The curved channel may have a width of 0.0721 inches, 0.188 inches, 0.256 inches, 0.389 inches, or any width therebetween.

As used herein, a curved channel having "rounded ends" refers to a rounded-rectangular or elongated oval shape. The radii of the rounded corners of the rounded rectangle that forms the curved channel may be equal to half the width of the curved channel so that the rounded ends appear to be half-circles capping the ends of the curved channel.

In some embodiments, the bail has a width of from about 0.05 inches to about 0.3 inches. For example, the bail may have a width of 0.05 inches, 0.1 inches, 0.15 inches, 0.2 inches, 0.25 inches, or 0.3 inches. The bail may have a width of 0.073 inches, 0.135 inches, 0.198 inches, 0.276 inches, or any width therebetween.

In some embodiments, the third portion and fourth portion of the body are configured to be inserted into the barrel of a rifle.

In some embodiments, the button includes an upper pressing portion. The upper pressing portion may include a textured surface. In some embodiments, the button includes a primary shaft. The primary shaft may include a recessed groove. In some embodiments, the primary shaft of the button has a first shaft diameter above the recessed groove, a second shaft diameter within the recessed groove, and a third shaft diameter below the recessed groove. In some embodiments, the first shaft diameter is greater than the third shaft diameter, and the third shaft diameter is greater than the second shaft diameter.

In some embodiments, the button includes a spring housing disposed within a base of the primary shaft and a securing lip around a perimeter of the base of the primary shaft.

In some embodiments, the button is configured to be pressed into the body, thereby drawing the plurality of ball-bearings into the recessed groove and permitting the latch to be inserted into or removed from the barrel of a rifle. In some embodiments, the spring is disposed within the spring housing and contacts the fourth portion of the body such that the spring is configured to pressed the button upwards and return the button to a standby position after the button has been pressed. In some embodiments, the securing lip and primary shaft of the button rests against the plurality of ball-bearings when the button is in a standby position, thereby securing the ball-bearings within the ball-bearing holes, preventing the button from being removed from the body unintentionally, and preventing the latch from being removed from the rifle unintentionally.

FIG. 1 is a perspective view of a monolithic latch body 100 having a planar first portion 102 that is triangular in shape. A first side 104 of the first portion 102 has a first radius of curvature. A second side 106 and a third side 108 of the first portion 102 are straight. Each of the three corners 110, 112, and 114 are rounded. A circular hole 116 is located proximal to the first corner 110 of the first portion and equidistant from the second side 106 and third side 108 of the first portion 102. A curved channel 118 is disposed proximal to the first side 104 of the first portion 102. The curved channel 118 has a second radius of curvature equal to the first radius of curvature. The curved channel 118 extends from second corner 112 to third corner 114 of the first portion 102. Sides 106 and 108 are positioned at an angle α to each other.

In some instances, the shape of the first portion may be triangular with rounded corners. In other instances, the first portion may be triangular with sharp corners. There may be no curved sides (all sides straight), one curved side, two curved sides, or three curved sides. The first portion may have another shape, such as a circle, oval, square, rectangle, a rounded polygon, or any other suitable shape.

In some instances, the channel has a radius of curvature equal to the first radius of curvature. In other instances, channel has a radius of curvature greater than or lesser than the first radius of curvature. In some instances, the first side of the first portion is straight, with no radius of curvature. In some embodiments, the channel is straight, with no radius of curvature.

Figure 2:
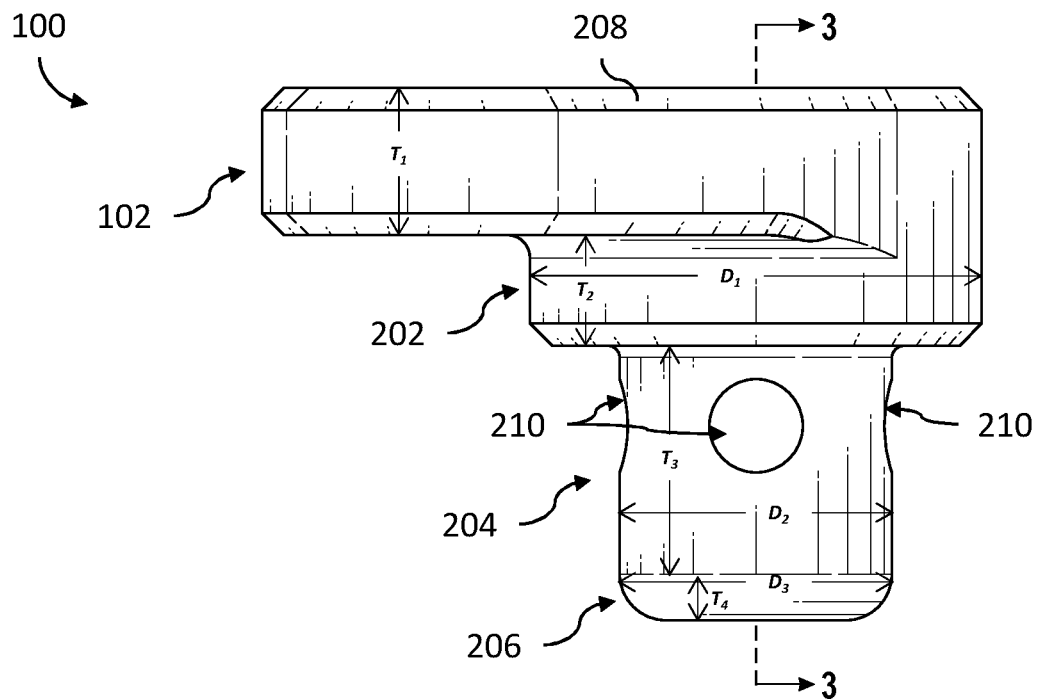
FIG. 2 is a side view of a quick detach latch body in accordance with the present disclosure.

FIG. 2 is a side view of latch body 100 having a first portion 102, second portion 202, third portion 204, and fourth portion 206. First portion 102 has a first thickness $T_1$, second portion 302 has a second thickness $T_2$, third portion 204 has a third thickness $T_3$, and fourth portion 206 has a fourth thickness $T_4$. First portion 102 has edges 208 that are chamfered. Second portion 202 has a first outer diameter $D_1$, third portion 204 has a second outer diameter $D_2$, and fourth portion 206 has a third outer diameter $D_3$. Third portion 204 has a plurality of ball-bearing holes 210.

Figure 3:
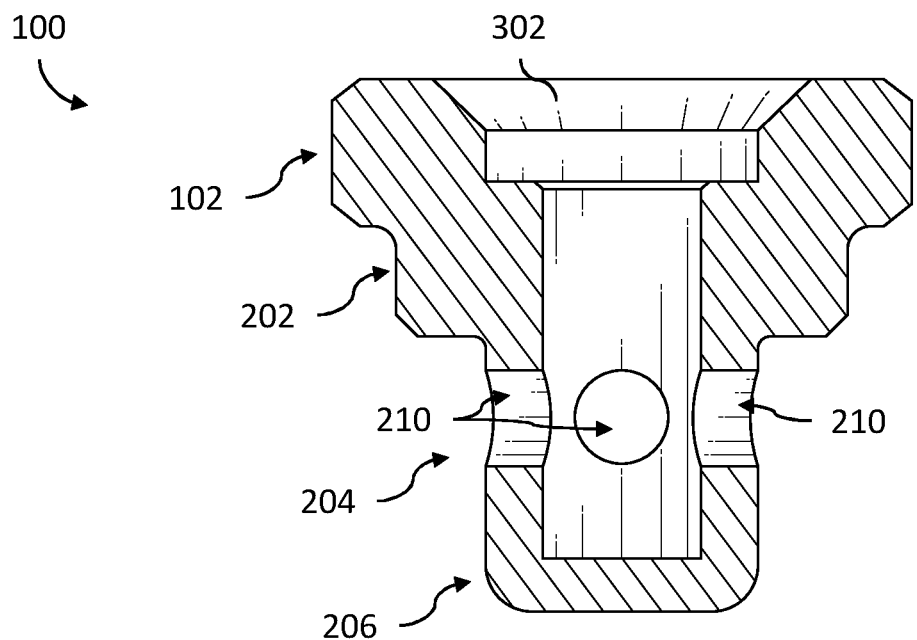
FIG. 3 is a cross-sectional view of a quick detach latch body in accordance with the present disclosure.

FIG. 3 is a cross-sectional view of latch body 100 along the line 3-3. Hole 116 has edges 302 that are chamfered.

Figure 4:
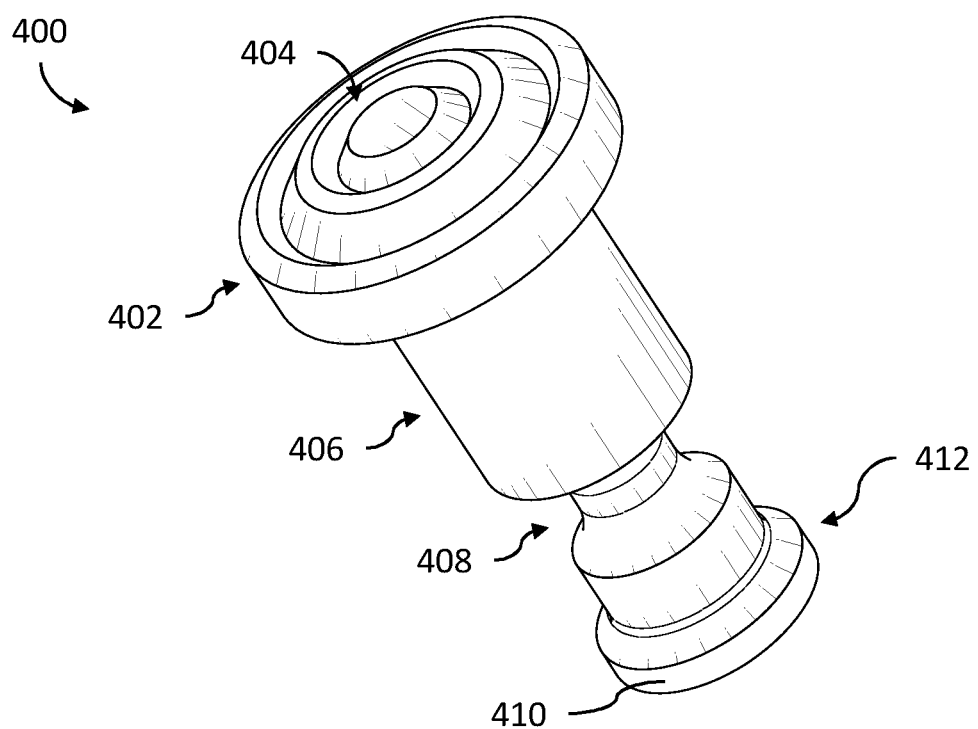
FIG. 4 is a perspective view of a button in accordance with the present disclosure.
Figure 5:
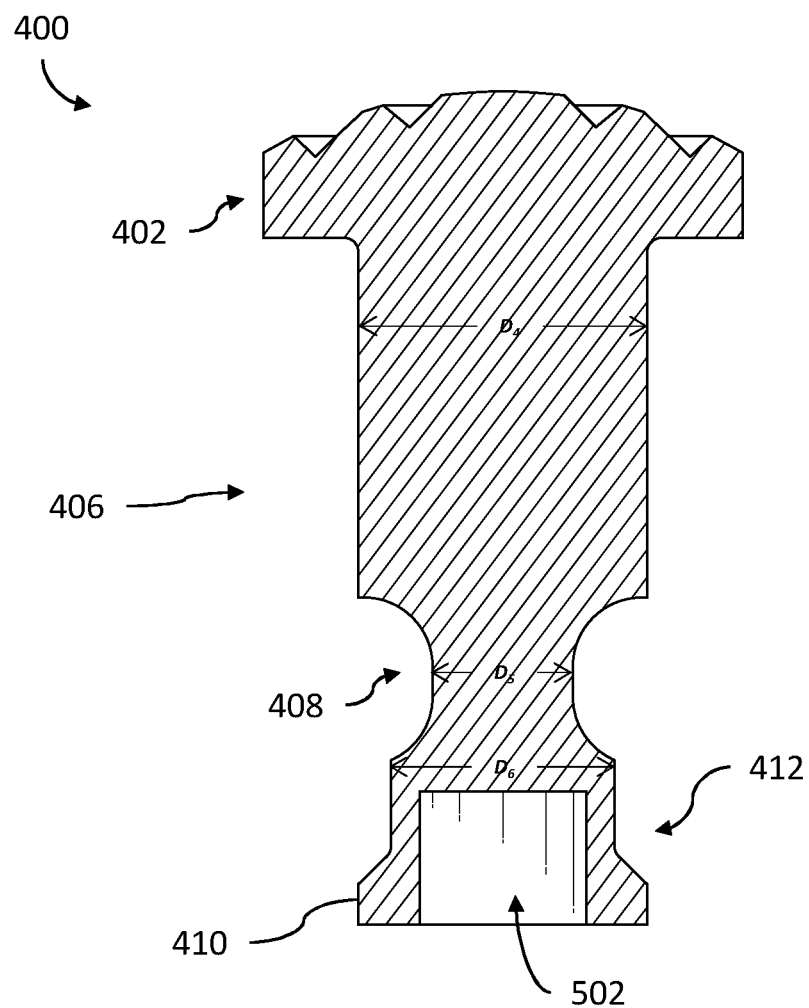
FIG. 5 is a cross-sectional view of a button in accordance with the present disclosure.

FIG. 4 is a perspective view of a button 400 having an upper pressing portion 402, textured surface 404, primary shaft 406, recessed groove 408, and securing lip 410 disposed around a perimeter of a base 412 of the primary shaft 406. FIG. 5 is a cross-sectional view of button 400. Primary shaft 406 has a first shaft diameter $D_4$ above the recessed groove 408, a second shaft diameter $D_5$ within the recessed groove 408, and a third shaft diameter $D_6$ below the recessed groove 408. Spring housing 502 is disposed within the base 412 of the primary shaft 406.

Figure 6:
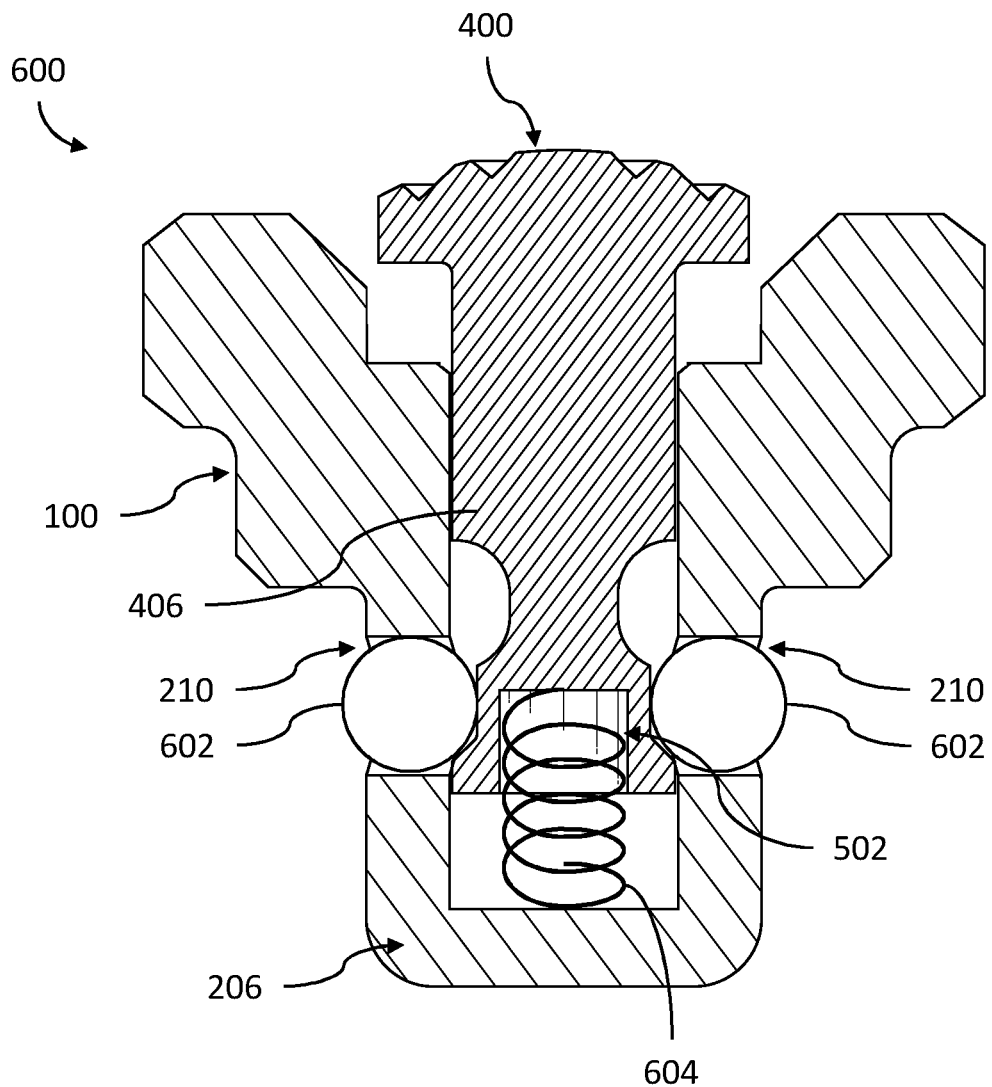
FIG. 6 is a cross-sectional view of a quick detach latch in accordance with the present disclosure.
Figure 7:
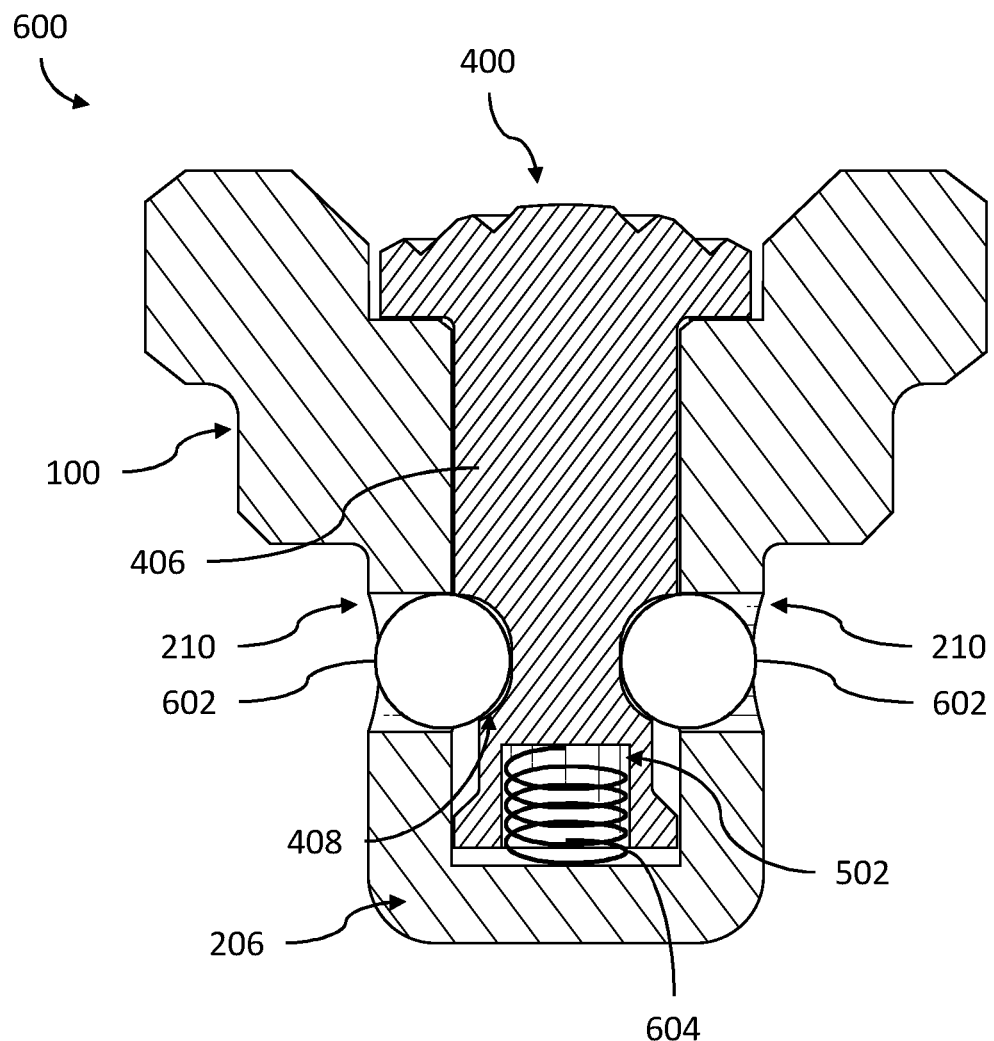
FIG. 7 is a cross-sectional view of a quick detach latch in accordance with the present disclosure.

FIG. 6 is a cross-sectional view of latch 600 with button 400 in a standby position within latch body 100 with ball-bearings 602 secured within ball-bearing holes 210 by the primary shaft 406 and securing lip 410. In a standby position, securing lip 410 contacts the ball-bearings 602 due to the tension of spring 604, thereby securing button 400 within latch body 100. Spring 604 is disposed within spring housing 502 and pressed against the fourth portion 206 of latch body 100. FIG. 7 is a cross-sectional view of latch 600 with button 400 in an actuated position with ball-bearings 602 drawn into the recessed groove 408 of the primary shaft 406 and spring 604 in a compressed position.

Since the securing lip of the button is responsible for securing the button within the latch body, there is no reliance upon a bail to keep the button within the latch button, as is the case with prior latches. Thus, in operation, a failure of the bail will not result in destruction of the button-body assembly, as is the case with prior latches. Furthermore, since the latch body is monolithic, including the bail, the likelihood of failure is dramatically reduced, whereas previous bails included a welded ring that may fail at the weld.

EXAMPLES

A movement-free quick detach latch as described herein was manufactured. The first portion of the body had a first thickness of 0.2 inches, the second portion of the body had a second thickness of 0.151 inches, the third portion of the body had a third thickness of 0.302 inches, and a the fourth portion of the body had a fourth thickness of 0.072 inches. The latch had an overall thickness of 0.725 inches. The first radius of curvature of the first side of the first portion was 3.323 inches, and the second radius of curvature of the curved channel was 3.323 inches. The hole had an inner diameter of 0.218 inches. The second side of the first portion and the third side of the first portion formed an angle with each other of 77.935°. The curved channel had a length of 0.865 inches as measured along an arc formed by the second radius of curvature. The curved channel had a width of 0.188 inches, and the bail had a width of 0.135 inches. The latch included four ball-bearings and four ball-bearing holes.

The first shaft diameter of the primary shaft of the button was 0.216 inches, the second shaft diameter of the primary shaft was 0.104 inches, and the third shaft diameter of the primary shaft was 0.167 inches.

While the disclosure has been described with reference to a number of embodiments, it will be understood by those skilled in the art that the disclosure is not limited to such embodiments. Rather, the disclosure can be modified to incorporate any number of variations, alterations, substitutions, or equivalent arrangements not described herein, but which are commensurate with the spirt and scope of the disclosure. Conditional language used herein, such as "can," "could," "might," or "may," unless specifically stated otherwise, or otherwise understood within the context as used, generally is intended to convey that certain embodiments include, while other embodiments do not include, certain features, elements or functional capabilities. Additionally, while various embodiments of the disclosure have been described, it is to be understood that aspects of the disclosure may include only some of the described embodiments. Accordingly, the disclosure it not to be seen as limited by the foregoing described, but is only limited by the scope of the appended claims.

The invention claimed is:

1. A latch for attaching a sling to a rifle, comprising:
a monolithic body;
a cylindrical button comprising a spring housing;
a spring disposed within the spring housing; and
a plurality of ball-bearings, wherein:
the body comprises a planar first portion having a first thickness, an upward-facing flat surface, and a triangular shape with three sides and three corners,
a first side of the first portion has a first radius of curvature,
a second side and a third side of the first portion are straight,
each of the three corners are rounded,
the button is disposed within a circular hole having a center located proximal to a first corner of the first portion and equidistant from the second side of the first portion and third side of the first portion,
the button is configured to be pressed into the body in a direction orthogonal to the upward-facing flat surface, and
a curved channel is disposed proximal to the first side of the first portion, wherein:
the curved channel has a second radius of curvature equal to the first radius of curvature,
the curved channel extends from a second corner of the first portion to a third corner of the first portion,
the curved channel is configured to accept a strap of the sling, and
the curved channel defines a bail in the body around which the strap of the sling attaches;
wherein the spring contacts a portion of the body, and wherein the spring is configured to press the button upwards to return the button to a standby position after the button has been pressed.

2. The latch of claim 1, wherein the body further comprises a hollow, cylindrical second portion having a first outer diameter and a second thickness located on the underside of the first portion proximal to the first corner, wherein the hollow, cylindrical second portion has a center coincident with the center of the circular hole of the first portion such that the hollow, cylindrical second portion and the circular hole share a common inner surface and a common inner diameter.

3. The latch of claim 2, wherein the body further comprises a hollow, cylindrical third portion having a second outer diameter and a third thickness located on the underside of the second portion, wherein the second outer diameter is less than the first outer diameter,
wherein the hollow, cylindrical third portion has a center coincident with the center of the hollow, cylindrical second portion and the center of the circular hole such that the circular hole, the second portion, and the third portion share the common inner surface and the common inner diameter, and
wherein the third portion further comprises a plurality of ball-bearing holes, each ball-bearing hole corresponding to one of the plurality of ball-bearings.

4. The latch of claim 3, wherein the body further comprises a round, fourth portion having a third diameter and a fourth thickness located on the underside of the hollow, cylindrical third portion, wherein the third diameter is equal to the second outer diameter, and wherein the round, fourth portion has a center coincident with the center of the hollow, cylindrical third portion.

5. The latch of claim 4, wherein the fourth thickness is from about 0.03 inches to about 0.11 inches.

6. The latch of claim 4, wherein the third portion and fourth portion are configured to be inserted into a barrel of a rifle.

7. The latch of claim 4, wherein the button comprises a primary shaft and a recessed groove in the primary shaft, and wherein the button has a first shaft diameter above the recessed groove, a second shaft diameter within the recessed groove, and a third shaft diameter below the recessed groove, and wherein the first shaft diameter is greater than the third shaft diameter and the third shaft diameter is greater than the second shaft diameter.

8. The latch of claim 7, wherein the spring housing is disposed within a base of the primary shaft and a securing lip is formed around a perimeter of the base of the primary shaft, and wherein the button is configured to be pressed into the body, thereby permitting the plurality of ball-bearings to slide into the recessed groove and permitting the latch to be inserted into or removed from a barrel of a rifle.

9. The latch of claim 8, wherein the spring contacts the fourth portion of the body.

10. The latch of claim 8, wherein the securing lip and primary shaft of the button rests against the plurality of ball-bearings when the button is in the standby position, thereby securing the ball-bearings within the ball-bearing holes, preventing the button from being removed from the body unintentionally, and preventing the latch from being removed from the rifle unintentionally.

11. The latch of claim 3, wherein the third thickness is from about 0.1 inches to about 1 inch.

12. The latch of claim 2, wherein the first thickness is from about 0.1 inches to about 0.5 inches, and wherein the second thickness is from about 0.05 inches to about 0.3 inches.

13. The latch of claim 1, wherein the latch has an overall thickness of from about 0.25 inches to about 2 inches.

14. The latch of claim 1, wherein the circular hole has an inner diameter of from about 0.1 inches to about 0.3 inches.

15. The latch of claim 1, wherein the second side of the first portion and the third side of the first portion form an angle with each other of from about 60° to about 100°.

16. The latch of claim 1, wherein the second radius of curvature is from about 2.5 inches to about 4.5 inches.

17. The latch of claim 16, wherein the curved channel has a length of from about 0.5 inches to about 2 inches as measured along an arc formed by the second radius of curvature.

18. The latch of claim 1, wherein the curved channel has a width of from about 0.05 inches to about 0.4 inches.

19. The latch of claim 1, wherein the bail has a width of from about 0.05 inches to about 0.3 inches.

20. The latch of claim 1, wherein the monolithic body has no moving parts.

* * * * *